H. W. GENDAR.
OIL WELL METER AND SAMPLER.
APPLICATION FILED AUG. 25, 1919.
1,341,898.
Patented June 1, 1920.
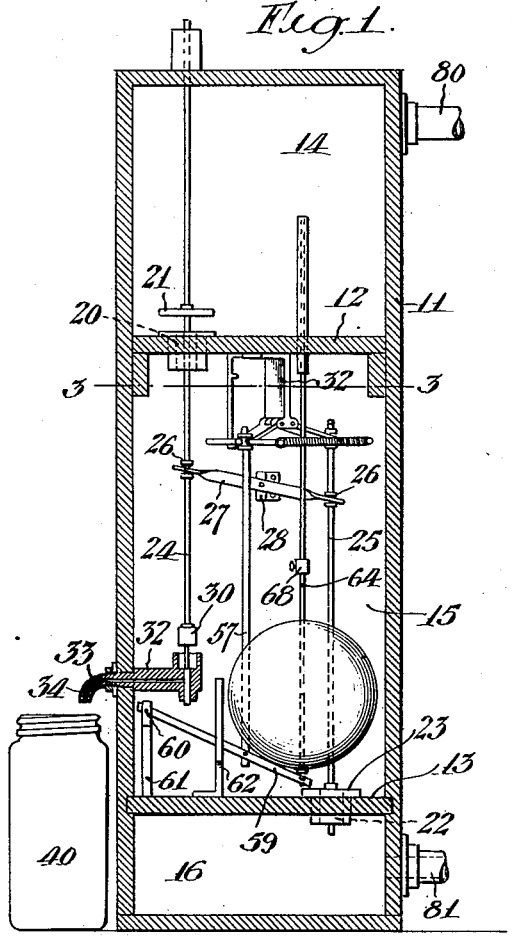
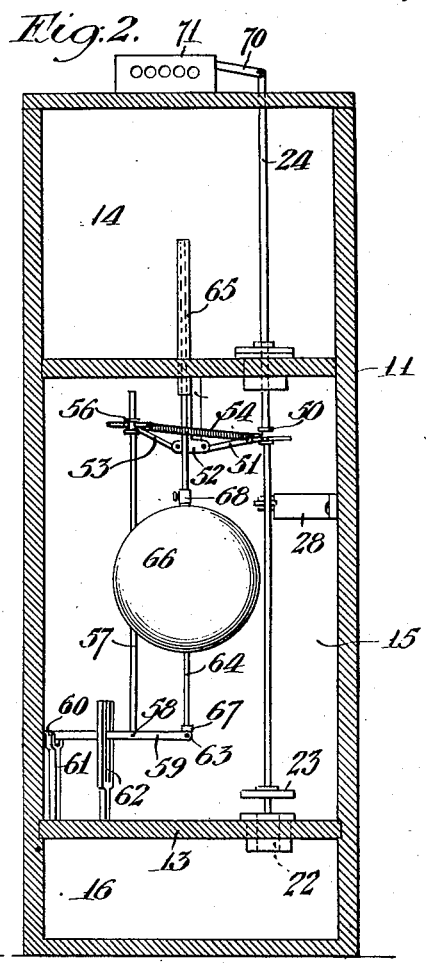
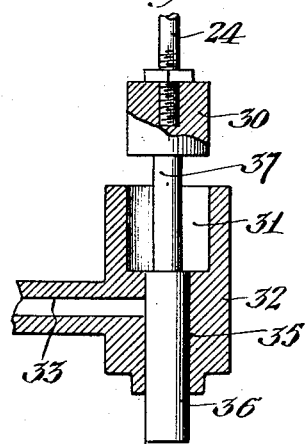
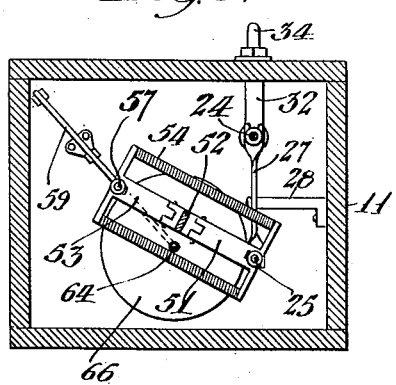
Inventor
Harry W. Gendar
by Graham Harris
Attorneys

UNITED STATES PATENT OFFICE.

HARRY W. GENDAR, OF LOST HILLS, CALIFORNIA.

OIL-WELL METER AND SAMPLER.

1,341,898.  Specification of Letters Patent.  Patented June 1, 1920.

Application filed August 25, 1919. Serial No. 320,041.

*To all whom it may concern:*

Be it known that I, HARRY W. GENDAR, a citizen of the United States, residing in Lost Hills, county of Kern, and State of California, have invented a new and useful Improvement Comprising the Oil-Well Meter and Sampler, of which the following is a specification.

In the production of petroleum oils it is practically the universal practice to run these oils into tanks which are gaged to determine the amount they contain, the oil being paid for on the basis of the amount determined in this manner.

It is also the practice to take samples from these tanks which are tested to determine the water and other foreign matter content.

It is also common practice to provide small tanks at various points into which the production from the individual wells is run and gaged for the purpose of determining the amount of oil produced by each well.

It is also the practice to take samples periodically from these smaller tanks for the purpose of determining the character of the oil.

The object of my invention is to provide a meter by which the amount of oil produced by any individual well or collection of wells can be readily determined, this meter being provided with means for taking small samples at regular intervals, these samples being delivered to the receptacle and collected from time to time for the purpose of testing same, and determining the average character of the oil.

Further objects and advantages will be set forth more in detail hereinafter.

Referring to the drawing, which is for illustration purposes only, Figure 1 is an elevation partly in section through an embodiment of my invention.

Fig. 2 is an elevation partly in section at right angles to Fig. 1.

Fig. 3 is a section on a plane represented by the line 3—3 of Fig. 1, and Fig. 4 is an enlarged view of the sampling valve.

In this embodiment of my invention, a case 11 is provided, having an upper partition 12 and a lower partition 13, these partitions dividing the case into a storage chamber 14 and a measuring chamber 15 and an outlet chamber 16.

An opening 20 which may be closed by an upper valve 21 is provided in the partition 12 and an opening 22 which may be closed by a lower valve 23 is provided in the partition 13.

The upper valve 21 is provided with an upper valve rod 24 and the valve 23 is provided with a lower valve rod 25. These rods are provided with collars 26, which engage a walking beam 27, which is pivoted on a casting 28 secured to the side of the case 11, these parts being so arranged that the valve 23 is seated when the valve 21 is raised from its seat and vice versa.

Carried on the lower end of the upper valve rod 24 is a piston 30, which is of a proper size to fit into a cup 31 formed in a sampler casting 32. An opening 33 extends through a spout 34 projecting from the side of the case 11, this opening 33 communicating with an opening 35 which is of smaller diameter than the cup 31 and which is closed by a cylindrical valve 36, the valve 36 being connected to the piston 30 through a stem 37 which is of somewhat smaller diameter than the valve 36.

With the parts in the upper position as shown in Figs. 1 and 4, the piston 30 is raised from the cup which is filled with oil. Whenever the valve 21 is seated the piston 30 is forced downwardly into the cup 31, the valve 35 being lowered sufficiently to allow the oil in the cup 31 to pass through the opening 35 and the opening 33 into a container 40 which is placed outside the case 11 to receive the samples. These samples are therefore taken at regular intervals, as will hereinafter be explained, and represent a true average of the character of the oil which is passing through the device.

The upper end of the lower valve rod 25 is provided with collars 50, which are engaged by the end of a driven snap lever 51 which is pivoted on a casting 52 on which is also pivoted a driving snap lever 53. The extreme ends of these levers 51 and 53 are connected by tension springs 54, as shown in Fig. 3.

The outer end of the lever 53 is engaged by collars 56 of a push rod 57, which is pivoted on a pin 58 carried by a diagonal lever 59, this lever being pivoted on a pin 60, carried in a casting 61, the lever being guided in a fork 62 and being pivoted on a pin 63 to a float rod 64. The upper end of this float rod 64 is guided by a tube 65, secured in the partition 12, the upper end of this tube being closed.

Sliding freely on the rod 64 is a float 66, this float striking against a collar 67 in its lower position and against an adjustable collar 68 in its upper position.

The upper valve rod 24 is extended through the top of the case and connected to a counter lever 70, which actuates a counter 71 which may be of any convenient form.

The oil to be measured is delivered through a pipe 80 to the storage chamber 14 and is withdrawn through a pipe 81 from the outlet chamber 16.

The method of operation is as follows:

The parts being in the position shown in Fig. 1, oil is delivered continuously or intermittently to the pipe 80 flowing through the opening 20 into the measuring chamber, the opening 22 being closed by the valve 23. This oil starts to fill the measuring chamber, and the float 66, rises and the oil fills the cup 31 with a small quantity of this oil. As the float continues to rise, it contacts with the washer 68, pulling upwardly on the push rod 57 through the rod 64 and the lever 59. The collars 56 on the push rod 57 push the driving snap lever 53 upwardly into the position shown in Fig. 2.

In the position shown in Fig. 1 the springs 54 act to hold the valve 23 on its seat. As the driving snap collar 53 rises the direction of pull of these springs is reversed so that the lever 51 is pulled upwardly, lifting the valve 23 from its seat and seating the valve 21 through the walking beam 27.

As the upper valve rod 24 moves downwardly the piston 30 enters the cup 37 and forces a definite portion of oil into the container 40.

The lifting of the valve 23 allows the oil of the measuring chamber 15 to escape into the outlet chamber 16 and from thence through the pipe 81 into the pipe line or into storage.

As the oil in the measuring chamber 15 escapes the float 66 falls until it strikes the collar 67, thus forcing the lever 59 and the push rod 57 downwardly. This pulls the driving snap collar 53 from the position shown in Fig. 2 into a position shown in Fig. 1, reversing the direction of pull of the springs 54 and seating the valve 23 and raising the valve 21 from its seat. This pulls the plunger 30 out of the cup 31 and sets the sampler to receive another sample. The operation is repeated indefinitely, a definite quantity of oil being measured by the upper and lower positions of the floats 66, the number of operations of the float being indicated by the counter 71. The amount measured at each time can be calibrated by changing the position of the washer 68 on the rod 64.

I claim as my invention:—

A meter comprising walls forming a storage chamber; walls forming a measuring chamber; walls forming an outlet chamber; an upper partition forming the bottom of the storage chamber and the top of the measuring chamber having an opening therein; a lower partition forming the bottom of the measuring chamber and the top of the outlet chamber having an opening therein; an upper valve adapted to close the opening in said upper partition; a lower valve adapted to close the opening in said lower partition; means actuated by the level of the fluid in said measuring chamber for actuating said valves, and means for drawing a measured sample from said measuring chamber at each actuation of said valves.

In testimony whereof I have hereunto set my hand at Lost Hills, California, this 18 day of Aug., 1919.

HARRY W. GENDAR.